United States Patent [19]
Mills

[11] Patent Number: 5,890,063
[45] Date of Patent: Mar. 30, 1999

[54] DOWNLOADING OF ROUTING NUMBERS TO DONOR SWITCHES WITHIN A TELECOMMUNICATIONS NETWORK

[75] Inventor: James L. Mills, Plano, Tex.

[73] Assignee: Ericsson Inc., Research Triangle Park, N.C.

[21] Appl. No.: 657,403

[22] Filed: Jun. 3, 1996

[51] Int. Cl.⁶ .................................................. H04Q 7/20
[52] U.S. Cl. ........................ 455/433; 455/435; 455/445
[58] Field of Search .................................. 455/432, 433, 455/435, 404, 445, 466

[56] References Cited

U.S. PATENT DOCUMENTS

| | | | |
|---|---|---|---|
| 4,310,727 | 1/1982 | Lawser | 179/18 B |
| 4,754,479 | 6/1988 | Bicknell et al. | 379/207 |
| 4,901,340 | 2/1990 | Parker et al. | 455/432 |
| 5,237,604 | 8/1993 | Ryan | 379/220 |
| 5,247,571 | 9/1993 | Kay et al. | 379/207 |
| 5,251,248 | 10/1993 | Tokunaga et al. | 379/58 |
| 5,400,390 | 3/1995 | Salin | 379/59 |
| 5,422,941 | 6/1995 | Hasenauer et al. | 379/207 |
| 5,423,068 | 6/1995 | Hecker | 455/56.1 |
| 5,442,683 | 8/1995 | Hoogeveen | 379/60 |
| 5,455,855 | 10/1995 | Hokari | 379/229 |
| 5,457,736 | 10/1995 | Cain et al. | 379/60 |
| 5,481,603 | 1/1996 | Gutierrez et al. | 379/221 |
| 5,504,804 | 4/1996 | Widmark et al. | 379/63 |
| 5,610,969 | 3/1997 | McHenry et al. | 455/432 |
| 5,621,783 | 4/1997 | Lanetto et al. | 455/433 |
| 5,628,051 | 5/1997 | Salin | 455/466 |
| 5,682,600 | 10/1997 | Salin | 455/422 |
| 5,689,548 | 11/1997 | Maupin et al. | 455/404 |
| 5,711,002 | 1/1998 | Foti | 455/433 |
| 5,712,900 | 1/1998 | Maupin et al. | 455/404 |
| 5,787,347 | 7/1998 | Yu et al. | 455/445 |

FOREIGN PATENT DOCUMENTS

| | | |
|---|---|---|
| 0 412 799 A2 | 8/1990 | European Pat. Off. . |
| WO 94/07338 | 3/1994 | WIPO . |
| WO 94/13070 | 6/1994 | WIPO . |
| WO 94/26055 | 11/1994 | WIPO . |
| WO 95/04424 | 2/1995 | WIPO . |
| WO 95/26113 | 9/1995 | WIPO . |

OTHER PUBLICATIONS

Generic Switching and Signaling Requirements for Number Portability J.J. Lichter, AT&T Network Systems, Generic Requirements, Issue 1.00 Feb. 2, 1996—pp. 1–75.

*Primary Examiner*—Edward F. Urban
*Assistant Examiner*—Tilahun Gesesse
*Attorney, Agent, or Firm*—Jenkens & Gilchrist, P.C.

[57] ABSTRACT

A centralized database within a Public Switched Telephone Network (PSTN) interfacing with a donor Public Land Mobile Network (PLMN) stores correlation data correlating a network address representing the new home location register (HLR) associated with a ported mobile station's identification number. As the centralized database is updated, such correlation data are further downloaded to the donor HLR. Thereinafter, in situations where the GMSC associated with the donor PLMN receives an incoming signal where no centralized database query has yet been performed, the donor HLR accordingly retrieves the stored network address correlated with the ported mobile station and forwards the incoming signal using the retrieved network address as the Called Party Number. The original mobile station identification number is also included into the Generic Address Parameter (GAP) of the routed IAM signal. The modified IAM signal is then routed to the proper Gateway Mobile Switching Center (GMSC) and accordingly forwarded to a mobile switching center (MSC) currently serving the ported mobile station.

23 Claims, 9 Drawing Sheets

DOWNLOADING OF ROUTING NUMBERS TO DONOR SWITCHES WITHIN A TELECOMMUNICATIONS NETWORK

CROSS REFERENCE TO RELATED APPLICATION

This application is related to U.S. application for patent Ser. No. 05/657,723, filed Jun. 3, 1996, now U.S. Pat. No. 5,839,072 entitled "Routing An Incoming Call To A Ported Mobile Station Within A Telecommunications Network" (Docket No. 27943/65) hereby incorporated by reference herein.

BACKGROUND OF THE INVENTION

1. Technical Field of the Invention

The present invention relates to a mobile telecommunications network and, in particular, to the routing of an incoming call to a mobile station relocated from a first home location register to a second home location register.

2. Description of Related Art

Within the Global System for Mobile (GSM) Communication or the Personal Communications System (PCS), each mobile station is assigned a unique identification number known as a Mobile Station Integrated Services Digital Network (MSISDN) number. A MSISDN number is dialed whenever a caller wants to communicate with a particular mobile station. The telecommunications network determines, by analyzing a part of the dialed MSISDN number, the particular home location register (HLR) which is associated with that mobile station and which stores routing information identifying the mobile switching center (MSC) currently serving the mobile station. By retrieving and utilizing such routing information, the telecommunications network is able to locate the mobile station in response to an incoming call so that a call connection can be established between the incoming caller and the mobile station.

Mobile subscribers often relocate from a first service area served by a first HLR to a second service area served by a second HLR as they relocate from one city to another or one geographic area to another. By relocating, a particular mobile station's pre-existing subscriber agreement with the first HLR is terminated and a new subscription agreement with the second HLR must be established. However, a specific series of MSISDN numbers are pre-assigned to each HLR. Therefore, by relocating from one HLR to another, the mobile station accordingly must be assigned a new MSISDN number within the series pre-assigned to the new second HLR. Changing the assigned MSISDN number is a cumbersome process in part because the mobile subscriber has to take his mobile station in for service and also inconveniently notify all relevant parties of his new MSISDN number (directory number).

American Telephone & Telegraph (AT&T) has proposed the concept of the use of a location routing number (LRN) to alleviate some of the analogous problems associated with wireline terminals of subscribers who move from one region or network to another without changing their MSISDN numbers. In accordance with the LRN concept, a centralized database storing a network address representing the end office currently serving the wireline terminal is queried by a signal transfer point (STP) or a service switching point (SSP) within a Public Switched Telephone Network (PSTN) to route an incoming call to the correct end office. However, the above LRN concept is inapplicable for the mobile telecommunications environment because a mobile station is not physically attached to a single end office or mobile switching center (MSC). As a mobile station travels from one geographic area to another geographic area, a number of MSCs provide mobile service to the traveling mobile station. Therefore, implementing a centralized database with a network address representing a particular end office or MSC does not solve the above number portability problem within the mobile telecommunications environment.

A patent application titled "Routing An Incoming Call To A Ported Mobile Station Within A Telecommunications Network", filed by Guns-Shin Chien on Jun. 3, 1996 (hereinafter referred to as the Chien application), hereby incorporated by reference herein, discloses a system and method for maintaining a centralized database for storing data correlating a particular MSISDN with a network address representing the home Public Land Mobile Network (PLMN) and, more particularly, the home location register (HLR) within that particular PLMN currently serving the ported mobile station. Accordingly, when the centralized database is queried, the network address representing the current HLR serving the ported mobile station is returned.

Even though the Chien application enables the routing of an incoming call to a ported mobile station within a mobile telecommunications network, there are certain system characteristics which are not optimal for certain applications.

Since the telecommunications network cannot determine whether the mobile station has been ported or not just by analyzing the received MSISDN, even if only one number is ported out of a particular PLMN, all incoming calls intended for that particular PLMN have to be inefficiently queried by the centralized database. As an illustration, out of the 214-555-XXXX series, even if only one number is ported, incoming calls for each and every one of the 214-555-XXXX number series have to be queried by the centralized database. Even if a call is originated by a mobile station within the donor PLMN, the call must still be queried by the donor GMSC to the centralized database.

Furthermore, not all STPs, SSPs, and GMSCs connected to the donor PLMN or HLR have query capability. If an incoming signal is routed through an SSP not having query capability, the incoming signal will be incorrectly delivered to the donor HLR. Since the donor HLR no longer stores subscriber information pertaining to the ported mobile station, the routing of the incoming call fails.

Accordingly, there is a need for a mechanism to reroute incoming signals to the current PLMN serving a ported mobile station when such signals are received by the donor PLMN instead of being rerouted by a centralized database.

SUMMARY OF THE INVENTION

The present invention provides a method and apparatus for transporting a telecommunications signal to a mobile station relocated (ported) from a first home location register (HLR) to a second HLR. Such a signal includes an incoming call signal for establishing a call connection with the ported mobile station. A network address representing an HLR associated with a mobile station and a mobile identification number representing that particular mobile station are correlated and stored in a centralized database. The data correlating the mobile identification number with the network address are further downloaded to the first HLR. In case a Gateway Mobile Switching Center (GMSC) associated with the first HLR receives an incoming signal intended for the ported mobile station without being rerouted by the centralized database, a signal requesting routing information is transmitted to the first HLR. The first HLR then retrieves the correlated network address representing the second HLR by indexing on the mobile identification number identifying the received signal. The retrieved network address is returned back to the GMSC. The GMSC accordingly reroutes the incoming signal to a Mobile Switching Center (MSC) currently serving the ported mobile station by utilizing the received network address as the Called Party Number. The original mobile identification number is further included in the Generic Address Parameter (GAP) of the rerouted signal.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
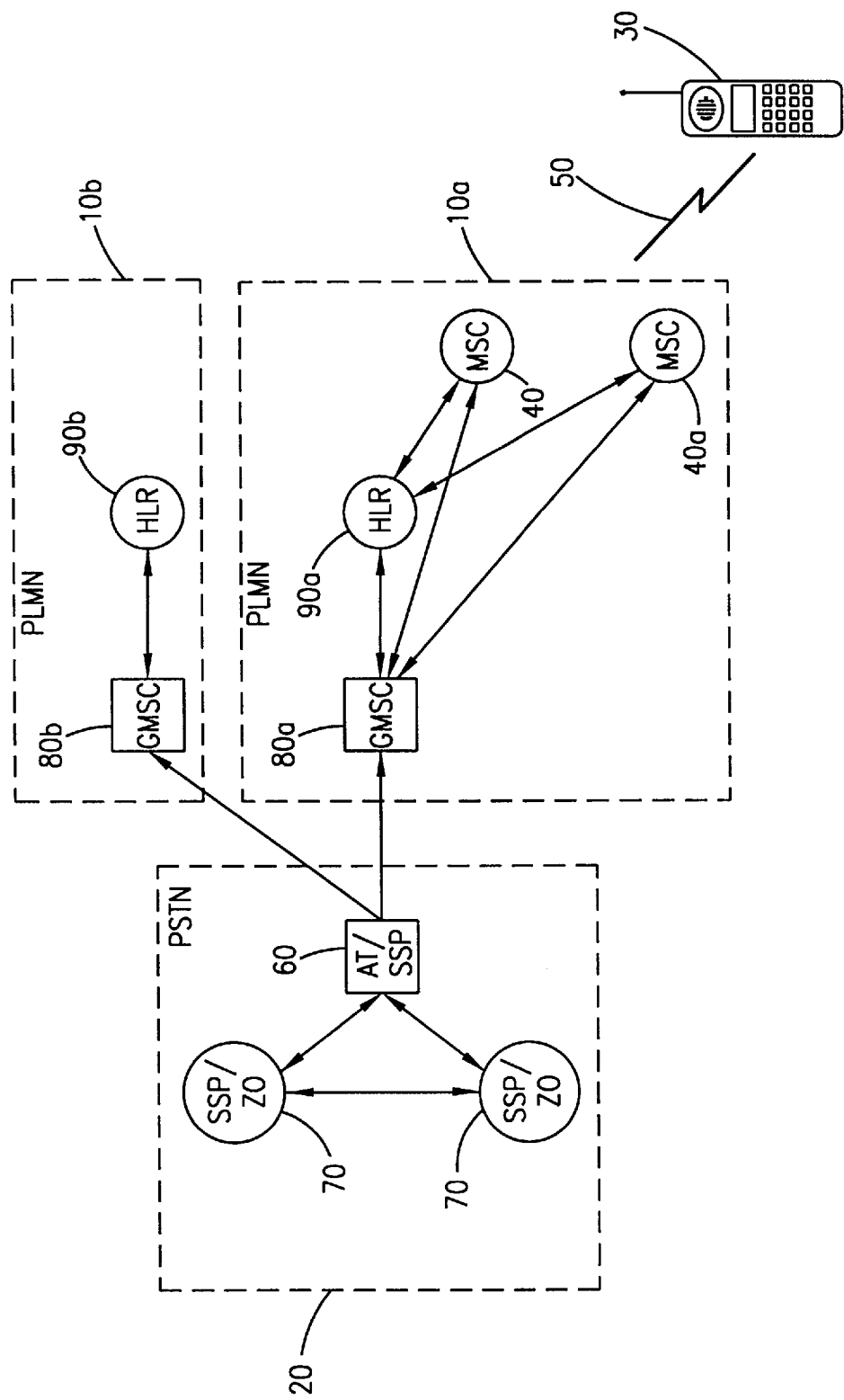
FIG. 1 is a block diagram illustrating the network interconnection of multiple Public Land Mobile Networks (PLMNs) to a Public Switched Telephone Network (PSTN)

FIG. 1 is a block diagram illustrating the network interconnection of multiple Public Land Mobile Networks (PLMNs) 10a–10b to a Public Switched Telephone Network (PSTN) 20. A mobile station 30 (also known as a mobile terminal or equipment) is associated with one of the PLMNs 10 as the home PLMN 10a. Within each PLMN 10, e.g., PLMN 10a, there are a number of different mobile switching centers (MSCs) 40 servicing the geographic area covered by the network. A mobile station 30 communicates with a radio base station (not shown) connected to one of the MSCs 40 via over-the-air communications links 50. The mobile station 30 served by one PLMN 10a then communicates with other wireline and wireless terminals by means of connections to the PSTN 20. A Service Switching Point (SSP) performing as an Access Tandem (SSP/AT) 60 within the PSTN 20 routes the mobile calls generated from the one PLMN 10a to wireline terminals serviced by one of its service switching points performing as end offices (SSP/EOs) 70 within the PSTN 20, or to another PLMN 10b by way of its gateway mobile switching center (GMSC) 80b.

For an incoming call intended for the mobile station 30, the incoming call is first routed to the GMSC 80a serving the home PLMN 10a. The GMSC 80a sends a signal requesting routing information to the home location register (HLR) 90a associated with that mobile station 30. The HLR 90a (which stores subscriber information and keeps track of the current location of the mobile station 30) returns a routing instruction back to the GMSC 80a. The returned routing instruction includes a network address indicating which MSC 40 (for example, MSC 40a) is currently serving the mobile station 30. Upon receipt of such routing information, the GMSC 80a transmits the incoming call to the serving MSC 40a. The serving MSC 40a then establishes a speech connection with the mobile station 30 located within its MSC serving area.

With the continuing development in the mobile telecommunications technology and the increasing number of mobile subscribers, an innovative concept called "number portability" is becoming popular. The number portability concept allows a mobile subscriber to relocate or "port" from an existing service area to a new PLMN area without changing the mobile subscriber's assigned MSISDN number or directory number. By not changing the assigned MSISDN number, the mobile subscriber need not have his mobile station manually serviced to encode a new MSISDN number. The mobile subscriber also need not inconveniently notify his friends and associates of his new MSISDN number.

Figure 2:
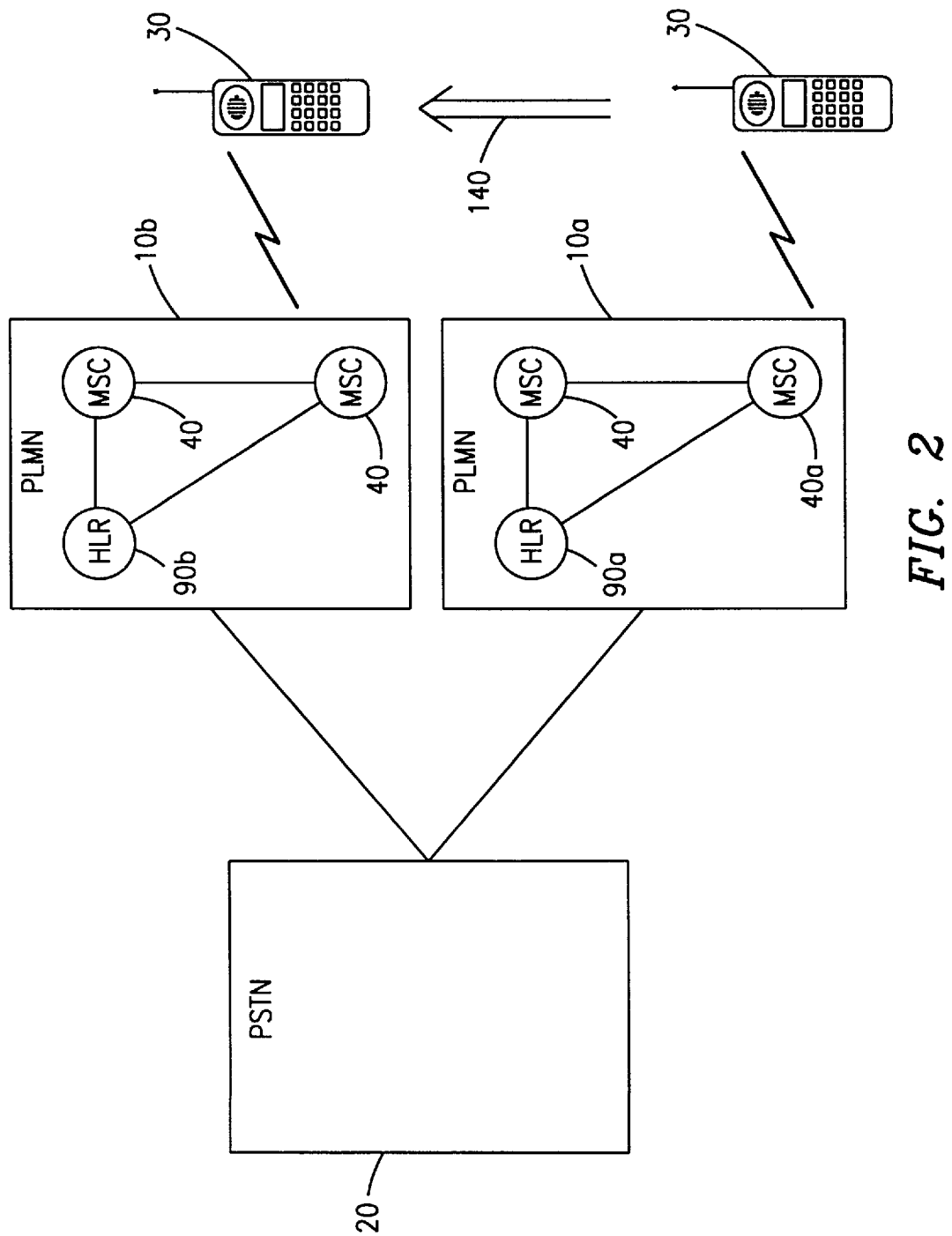
FIG. 2 illustrates a mobile station relocating from a first home location register (HLR) associated with a first PLMN to a second HLR associated with a second PLMN.

Reference is now made to FIG. 2 where a mobile station 30 associated with a first HLR 90a within a first PLMN 10a is shown relocating or porting 140 to a second HLR 90b within a second PLMN lob (inter-PLMN number portability). The mobile station 30 is initially registered with the PLMN 10a as the home PLMN. All incoming calls either from the PSTN 20 or another PLMN are received by the GMSC (not shown in FIG. 2, see FIG. 1) within the PLMN 10a and accordingly routed to the serving MSC 40a. As described previously, the GMSC properly routes an incoming call to the serving MSC 40a because the dialed MSISDN number includes a value indicative of which HLR within the home PLMN 10a is storing the requisite subscriber information. Consequently, the GMSC analyzes the received MSISDN number, determines the appropriate HLR, requests routing information from the determined HLR, and then routes the incoming call to the appropriate MSC.

In accordance with the concept of number portability and as illustrated by the relocation 140, the mobile station 30 terminates his subscription agreement with the existing HLR 90a and registers with the new HLR 90b within the new PLMN 10b without changing his MSISDN number. However, because the MSISDN number has not been updated in the mobile station to reflect the new HLR 90b and the new PLMN 10b, all future incoming calls are still routed to the old PLMN 10a. The GMSC within the PLMN 10a is not able to reroute the received incoming calls to the relocated mobile station 30 because the GMSC is no longer able to determine the correct HLR storing the subscriber information by merely analyzing the received MSISDN number.

Figure 3:
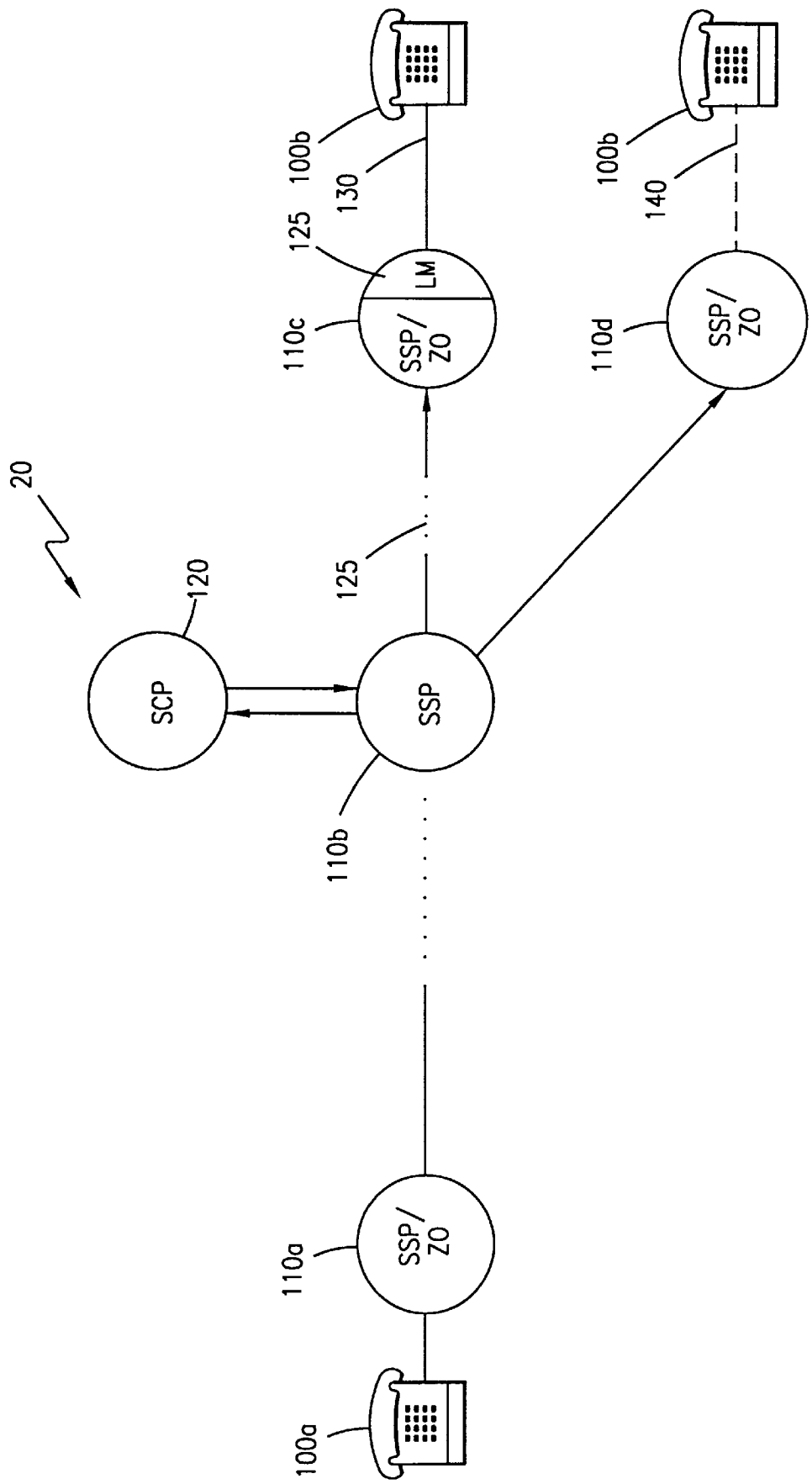
FIG. 3 is a block diagram illustrating the location routing number (LRN) system for routing an incoming call to a ported mobile station.

FIG. 3 is a block diagram illustrating the location routing number (LRN) concept for routing an incoming call to a ported wireline terminal as introduced by American Telephone & Telegraph (AT&T). In accordance with AT&T's LRN concept, a centralized database storing a network address representing the end office serving the ported wireline terminal is queried by the next to last signal network in the call path. A signal transfer point (STP) or service switching point (SSP) within the next to last network (e.g., PSTN 20) performs the query to route the call. A first wireline terminal 100a connected to an SSP/EO 110a originates an outgoing call connection towards a second wireline terminal 100b within the PSTN 20 by dialing a directory number representing the second wireline terminal 100b. However, the second wireline terminal 100b used to be served by a first SSP/EO 110d but has been ported to a second SSP/EO 110c (as illustrated by a dotted line 140). Using a conventional routing mechanism, the call setup request is routed towards the first SSP/EO 110d as specified by the dialed directory number representing the wireline terminal 100b. When the call setup signal is received by a query capable SSP 110b, the SSP 110b performs a database query to a centralized database service control point (SCP) 120. The SCP 120 stores correlation data correlating each ported directory number with a network address representing the new SSP/EOc serving the ported terminal. In response to the query request, the SCP 120 returns a network address representing the second SSP/EO 110c currently serving the wireline terminal 100b. The SSP 110b uses the retrieved network address as the new Called Party Number (CdPn) in the transmitted call setup signal such as an Initial Address Message (IAM). The originally dialed directory number representing the wireline terminal 100b is also included into a Generic Address Parameter (GAP) within the IAM signal and "piggy-back" to the serving SSP/EO 110c. Since the CdPn points to the serving SSP/EO 110c, the IAM signal is rerouted to the SSP/EO 110c instead of to the first SSP/EO 110d. The second SSP/EO 110c may be directly connected to the SSP 110b, or be connected through a number of signal transferring nodes as illustrated by a dotted line 125. Once the IAM signal is received by the second SSP/EO 110c, the encapsulated directory number representing the wireline terminal 100b is extracted from the GAP, the physical location of the wireline terminal 100b is determined by indexing its line module (LM) 125, and a call connection is established with the ported wireline terminal 100b via a wireline 130.

By introducing a centralized database for storing a network address representing the new SSP/EO, the LRN concept solves some of the number portability problems within the PSTN environment. However, such LRN implementation is inapplicable for the PLMN environment. A mobile station within a PLMN 10 is rarely associated with just one end office or mobile switching center (MSC). Due to its inherent nature of not being connected to any physical communications medium, a mobile station freely travels into a number of different geographic areas. Each time a mobile station leaves a first MSC service area and enters into a second MSC service area, the serving PLMN has to transfer the service from the first MSC to the second MSC. After the transfer, the first MSC is no longer involved in the call connection. Therefore, the idea of storing the network address representing a particular end office or MSC within a centralized database is inapplicable for the PLMN environment.

Figure 4:
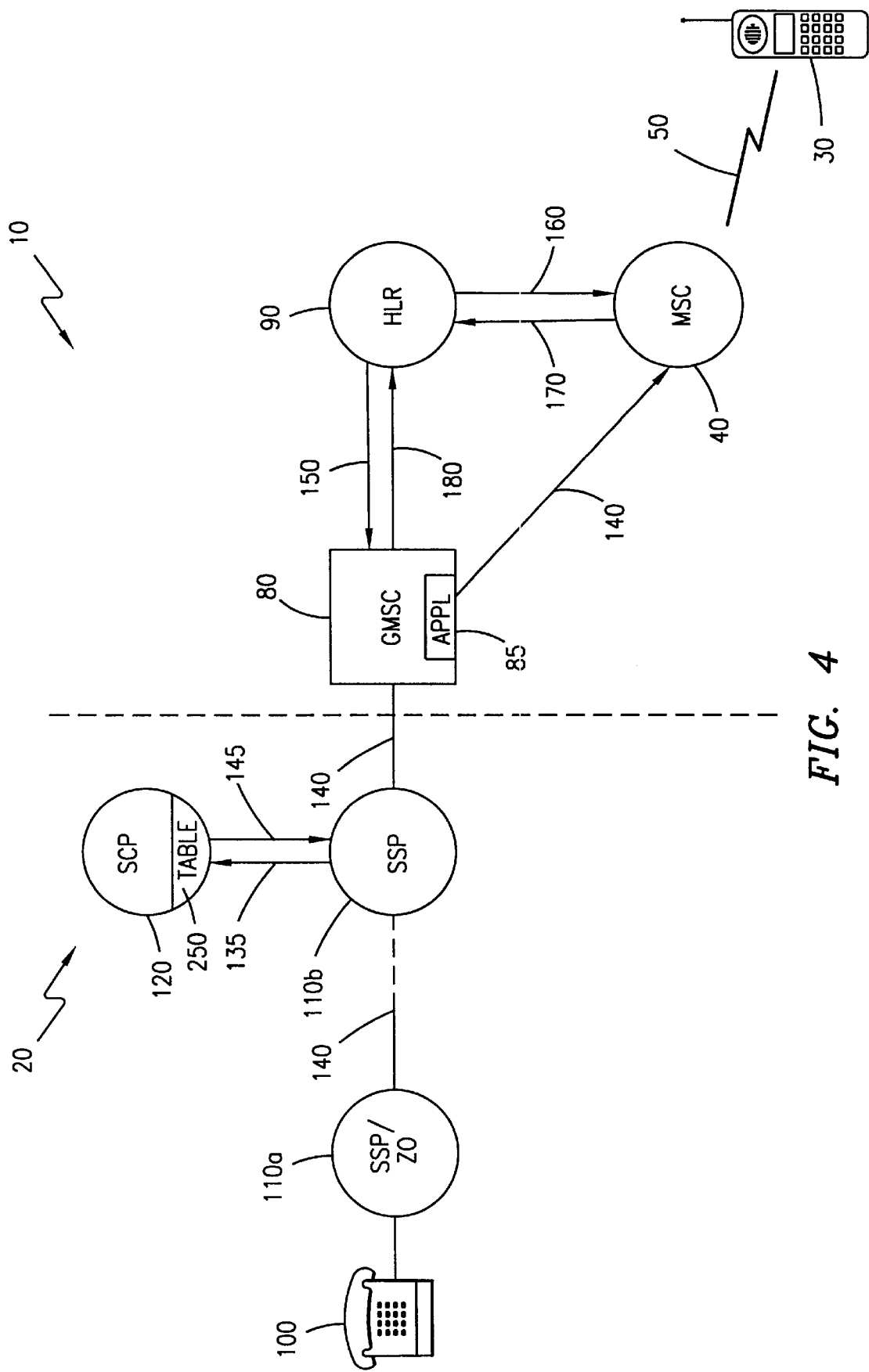
FIG. 4 is a block diagram illustrating the gateway routing number (GRN) system for routing an incoming call to a ported mobile station as disclosed in the Chien application.

FIG. 4 is a block diagram illustrating the gateway routing number (GRN) concept for routing an incoming call to a ported mobile station within the PLMN environment as disclosed in the Chien application. Instead of maintaining a centralized database for storing a network address representing a particular end office currently serving the mobile station 30, a centralized database for storing a network address representing a PLMN or, more particularly an HLR 90 currently serving the mobile station 30, is instead maintained (hereinafter referred to as a Gateway Routing Number—GRN).

A wireline terminal 100 connected to the SSP/EO 110a within the PSTN 20 or any other telecommunications terminal originates an outgoing call connection by dialing a mobile identification number such as a Mobile Station Integrated Service Digital Network (MSISDN) number representing the mobile station 30. The call connection signal is routed via the conventional routing mechanism until it reaches a query capable SSP 110b within the PSTN 20 as described in FIG. 3. The SSP 110b then sends a query signal 135 to the centralized database such as an SCP 120 requesting the GRN representing the home HLR associated with the mobile station 30. The SCP 120 indexes its memory table 250 with the received MSISDN number and retrieves the correlated GRN. The retrieved GRN is then transmitted back to the SSP 110b via a return signal 145. The SSP 110b assigns the retrieved GRN as the Called Party Number (CdPn) for the call setup signal 140, such as an Initial Address Message (IAM), and transmits it over to the PLMN 10. The dialed MSISDN number is also included into one of the optional parameters, such as a Generic Address Parameter (GAP), within the IAM signal 140. By analyzing the transmitted GRN representing the home HLR 90, the PSTN 20 is able to route the IAM signal 140 to the entry point— GMSC 80 of the serving PLMN 10. Upon receipt of the IAM signal 140, an application module 85 within the GMSC 80 extracts the included MSISDN number from the GAP and transmits a Mobile Application Part (MAP) based signal 150 such as a Send Routing Information (SRI) signal to the indicated HLR 90. The transmitted SRI signal 150 further includes the extracted MSISDN number and uses the received GRN as the Global Title (GT) for Called Party Address.

When the HLR 90 receives the SRI signal 150, it determines the corresponding International Mobile Subscriber Identity (IMSI) for the received MSISDN number and transmits another MAP based signal 160 requesting routing number to the serving MSC 40. The serving MSC 40 determines the current geographic location of the mobile station 30 and accordingly returns a routing number to the HLR 90 via an acknowledgment signal 170. The HLR 90, in turn, returns the routing number to the GMSC 80 via yet another acknowledgment signal 180. The GMSC 80 then reroutes the original IAM signal 140 to the serving MSC 40 as indicated by the received routing number. As a result, a call connection between the originating terminal 100 and the ported mobile terminal 30 is established via the radio link 50.

Figure 5:
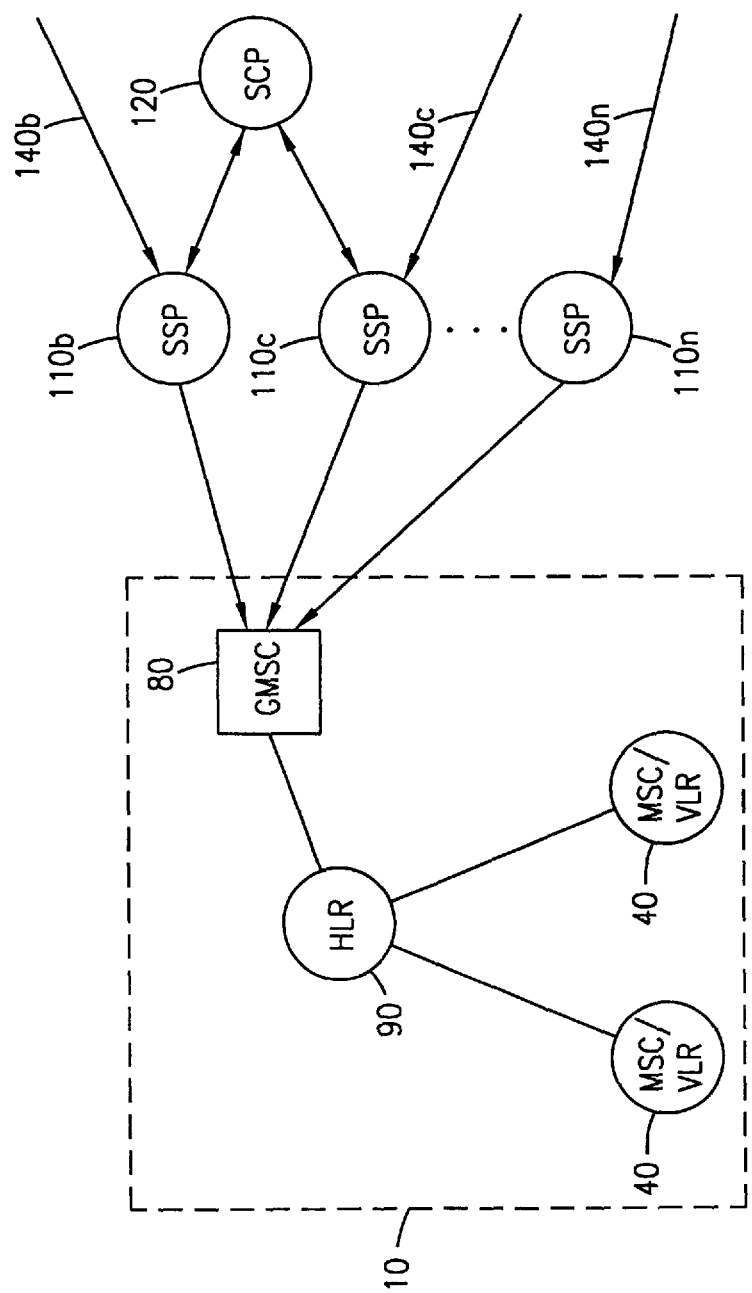
FIG. 5 is a block diagram illustrating multiple service switching points (SSPs) connected to a particular PLMN wherein at least one of said SSPs does not have database query capability.

Even though the GRN implementation as disclosed by the Chien application enables the routing of an incoming call to a ported mobile station, there are certain characteristics and limitations which are less than optimal for particular applications. Reference is now made to FIG. 5 illustrating multiple SSPs 110b–110n connected to a donor PLMN 10 wherein at least one of said SSPs does not have database query capability. In order for the above GRN implementation to work within the PLMN environment, all SSPs 110b–110n serving a particular PLMN 10 must be equipped to perform database query to the centralized database SCP 120. However, especially during the initial implementation phase of the GRN or LRN concept, not all SSPs or STPs will have the database query capability. As a result, only the signals being routed over the signal link 140b–140c connected to the SSPs 110b–110c having query capability are able to be rerouted to the new HLR (not shown). On the other hand, all incoming calls through the 140*n* signal link connected to the SSP 110*n* not having the query capability will still be routed to the donor PLMN 10 where data associated with the mobile station no longer exist. The incoming signal routed by the SSP 110*n* is forwarded to the GMSC 80 acting as an entry point for the PLMN 10. The GMSC 80 analyzes the received Called Party Number and, as a result, transmits an HLR interrogation signal to the donor HLR 90. Even though the received MSISDN points to the donor HLR 90, because the mobile station has been ported away from the donor PLMN 10, the HLR 90 no longer stores subscriber information enabling the telecommunications network to establish a call connection with the ported mobile station. Accordingly, the HLR interrogation by the donor HLR 90 and the call setup request by the GMSC 80 fail.

Figure 6:
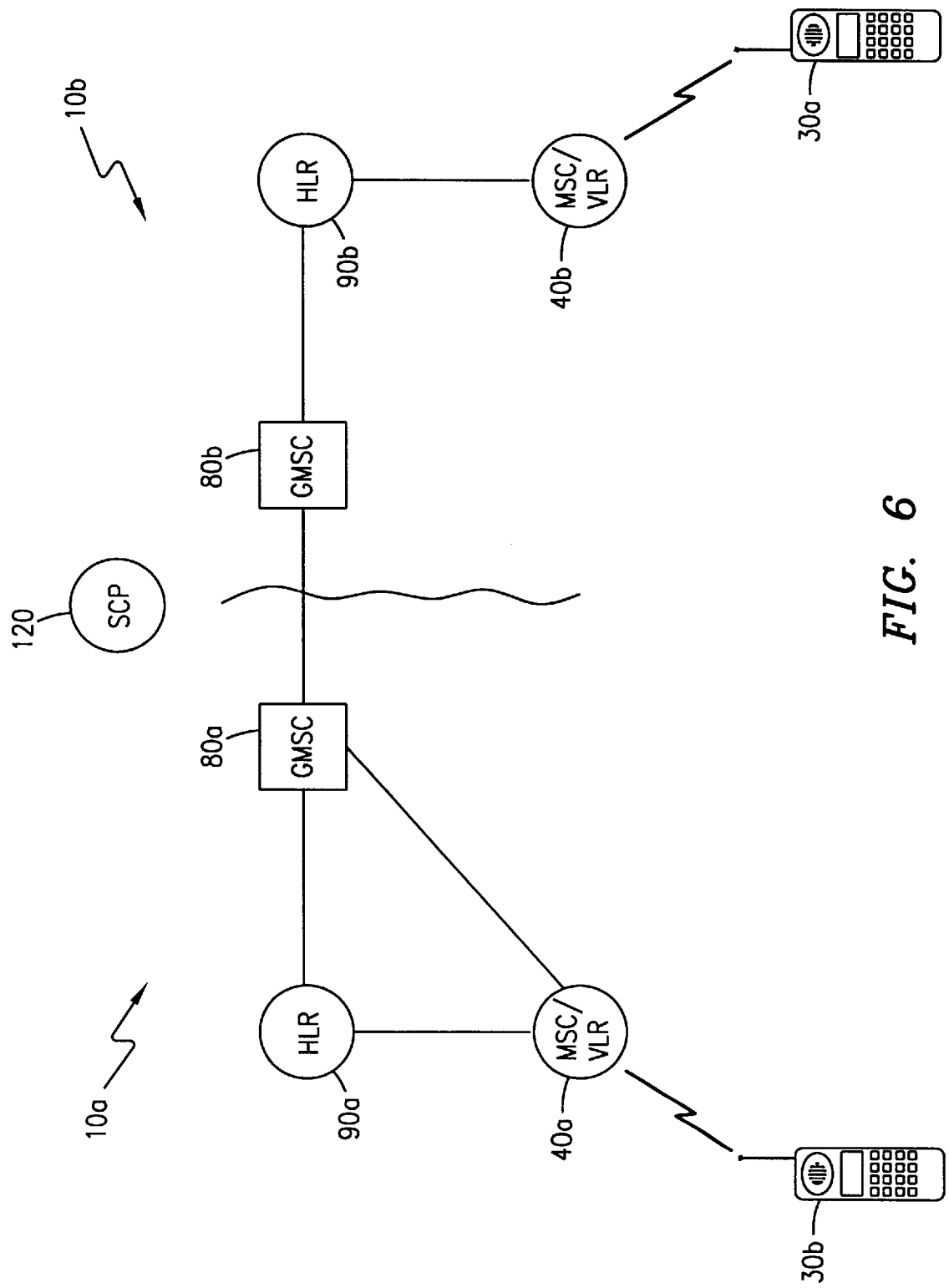
FIG. 6 is a block diagram illustrating a gateway mobile switching center (GMSC) within a particular PLMN not having database query capability.

As an illustration of another limitation imposed by the GRN implementation, reference is now made to FIG. 6 illustrating the GMSC 80*a* within the donor PLMN 10*a* not having database query capability. A mobile station 30*a* has been ported from the donor PLMN 10*a* to the new PLMN 10*b*. If another mobile station 30*b* within the donor PLMN 10*a* requests a call connection towards the ported mobile station 30*a* by dialing the associated MSISDN, the serving MSC/VLR 40*a* recognizes the first three prefixes as its own and routes the signal requesting call connection directly to its own GMSC 80*a*. The serving MSC/VLR 40*a* assumes that the HLR 90*a* stores the current location of the mobile station 30 and that the GMSC 80*a* needs to perform the HLR interrogation. The GMSC 80*a*, not knowing that the mobile station 30*a* has already been ported away from the donor PLMN 10*a*, initially has to perform a database query toward the home HLR 90*a*. Since the donor HLR 90*a* no longer stores the requisite subscriber information, the HLR interrogation fails. The GMSC 80*a* then has to perform another query toward the centralized database SCP 120. Furthermore, in case the GMSC 80*a* is not equipped to perform the query with the SCP 120, the rerouting of the incoming call fails.

Figure 7:
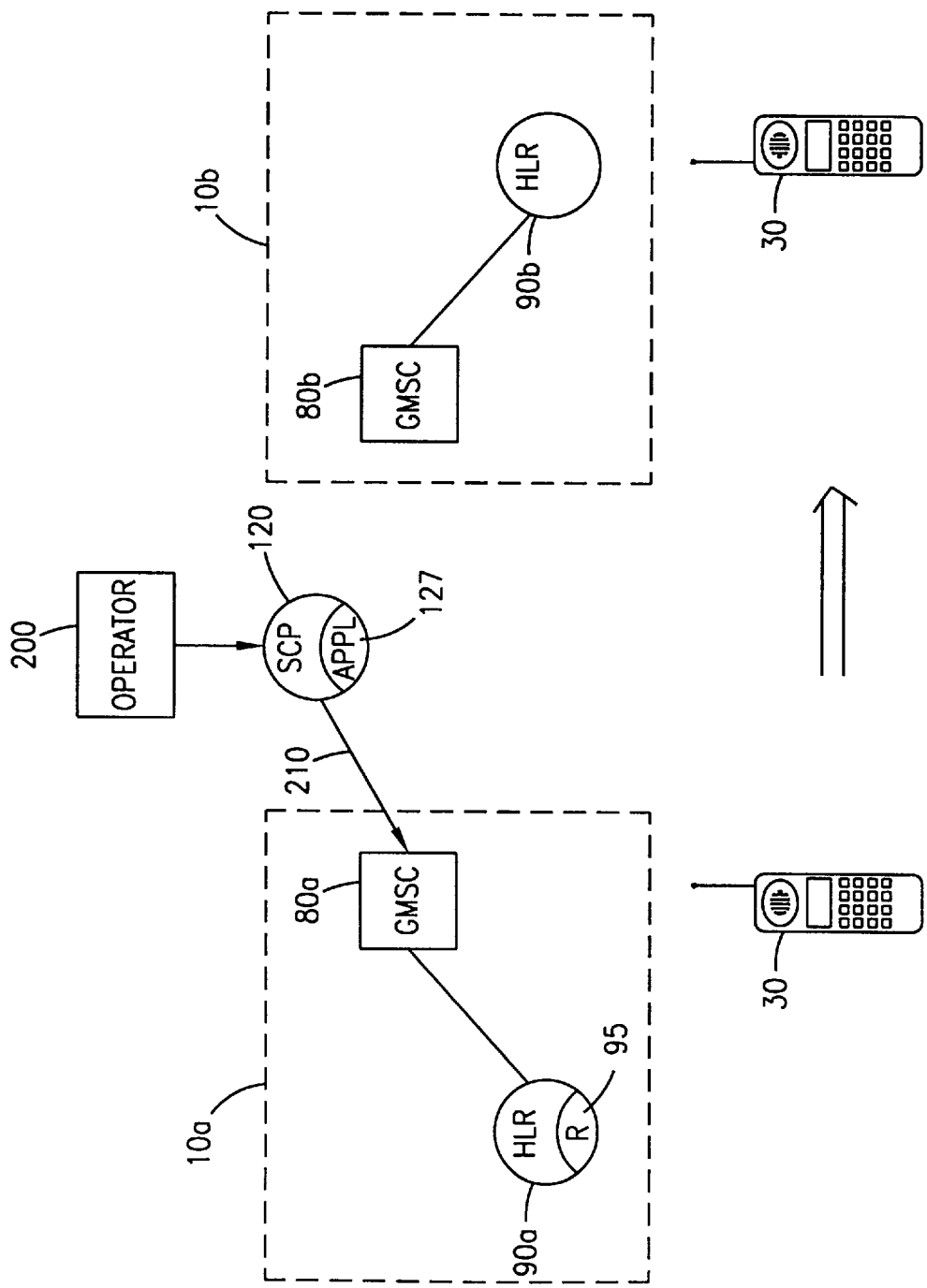
FIG. 7 is a block diagram downloading data correlating the mobile station integrated service directory number (MSISDN) associated with a ported mobile station with a network address representing the new home location register (HLR) to the donor HLR (the HLR where the mobile station has been ported from)

Reference is now made to FIG. 7 illustrating the communication of an update signal from the centralized database SCP 120 to the donor HLR 90*a* in accordance with the teachings of the present invention. Whenever the mobile station 30 is ported from a first HLR 90*a* within the first PLMN 10*a* to a second HLR 90*b* within the second PLMN 10*b*, an operator 200 responsible for maintaining the centralized database SCP 120 is notified. The operator 200 accordingly informs the centralized database SCP 120 with data correlating the MSISDN associated with the ported mobile station 30 with the network address representing the new HLR 90*b*. As a result, the correlation data are indexed and stored in the centralized database SCP 120. An application module 127 within the centralized database SCP 120 then transmits a signal downloading the updated data to the donor HLR 90*a*. The transmitted signal includes the MSISDN associated with the ported mobile station 30 and the network address representing the new HLR 90*b*. In a manner similar to handling an incoming signal, the specified MSISDN of the transmitted signal is analyzed by the telecommunications network and the update signal is routed to the appropriate GMSC 80*a* within the PLMN 10*a* (signal link 210). The GMSC 80*a*, by analyzing the received MSISDN, forwards the update signal to the donor HLR 90*a*. The donor HLR 90*a* then stores the data correlating the ported MSISDN with the network address representing the second HLR 90*b* in a register (R) 95. As described previously, the network address representing the second HLR 90*b* also identifies the GMSC 80*b* and the PLMN 10*b* serving the ported mobile station 30. As a result, for all mobile stations ported out of the donor HLR 90*a*, the SCP 120 and the HLR 90*a* both store the correlation data.

Figure 8:
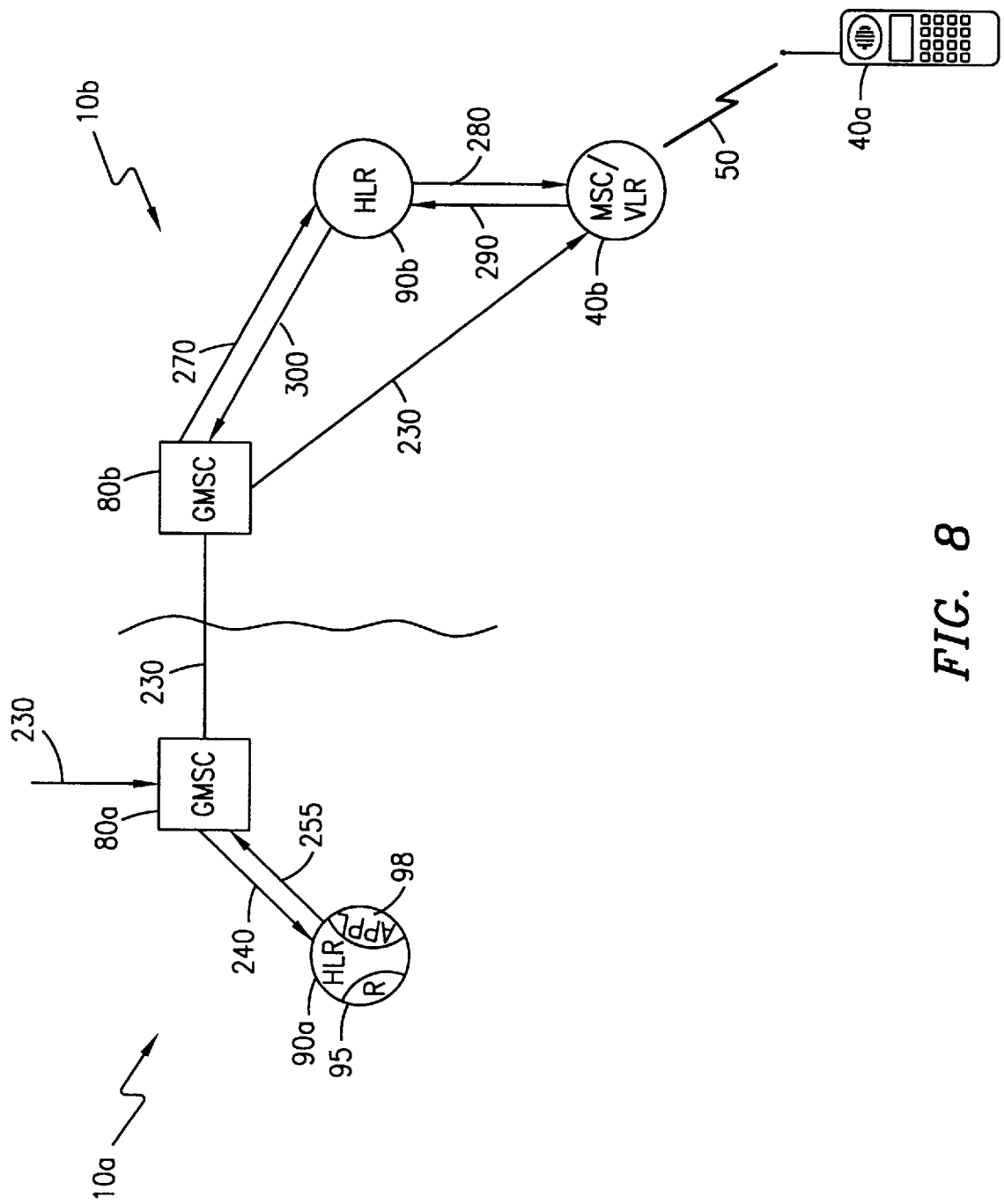
FIG. 8 is a block diagram illustrating the forwarding of an incoming signal from a first PLMN to a second PLMN.
Figure 9:
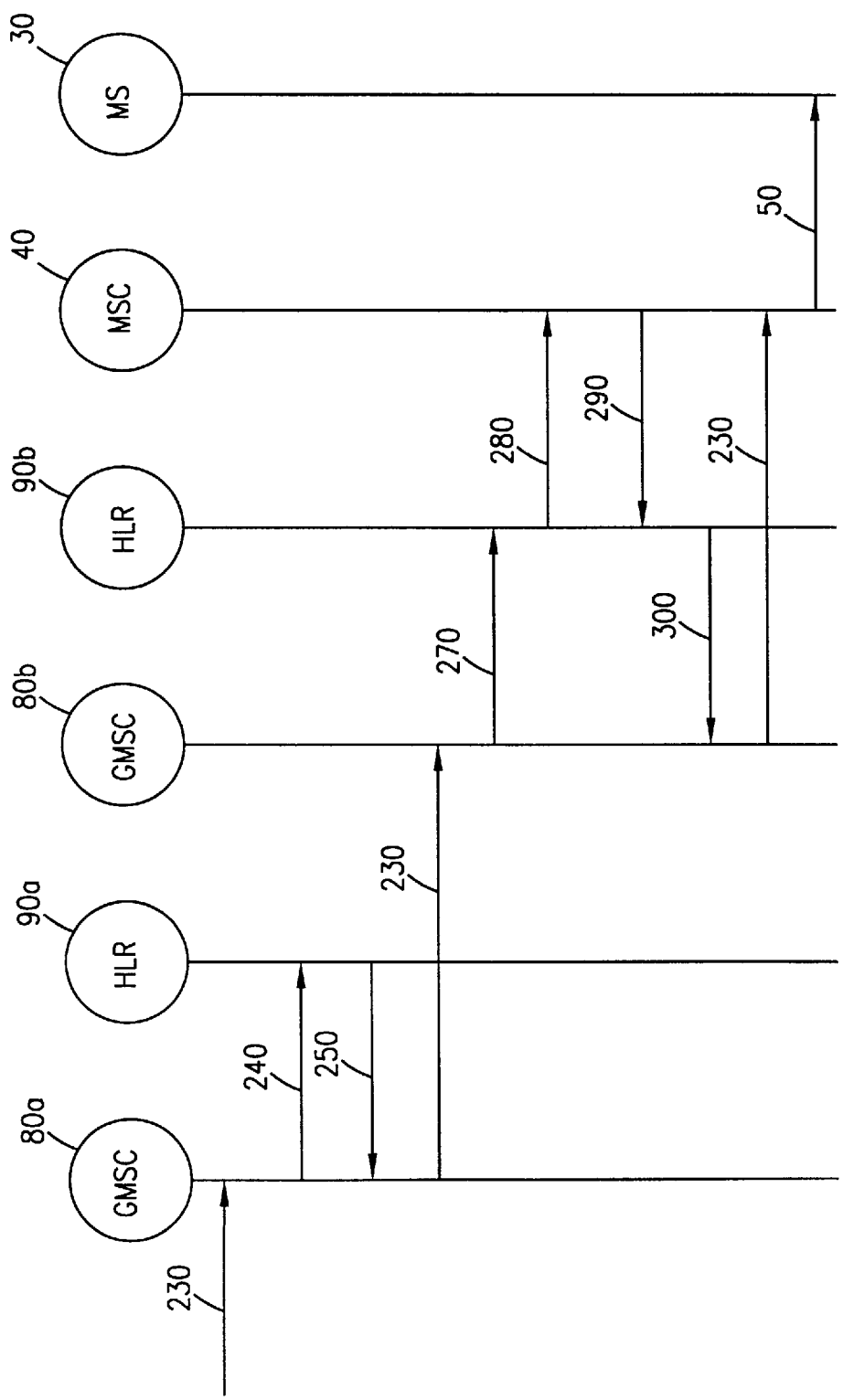
FIG. 9 is a signal sequence diagram illustrating the forwarding of an incoming signal from a first PLMN to a second PLMN.

Reference is now both made to FIGS. 8 and 9 illustrating the forwarding of an incoming call to the ported mobile station 30 by utilizing the correlated data downloaded in the donor HLR 90*a* in accordance with the teachings of the present invention. An incoming signal 230, i.e., IAM, for the ported mobile station 30 is received by the GMSC 80*a* serving the donor PLMN 10*a* as indicated by the MSISDN included in the Called Party Number parameter. As described previously, there are several ways an incoming signal can reach the GMSC 80*a* without causing a query to be performed to the centralized database. One instance includes a situation where a connected STP or SSP routing the incoming signal is not equipped to handle the database query. As another instance, in case another mobile station within the donor PLMN 10*a* originates a call connection towards the ported mobile station, the call setup request signal is received directly by the GMSC 80*a* from the MSC/VLR currently serving that particular mobile station requesting call origination.

After receiving the incoming signal 230, the GMSC 80*a* transmits a Mobile Application Part (MAP) based signal 240, such as a Send Routing Information (SRI) signal, requesting routing information to the donor HLR 90*a*. The donor HLR 90*a* determines that the mobile station 30 associated with the specified MSISDN has been ported away from the PLMN 10*a*, and the stored network address representing the new HLR 90*b* is retrieved and transmitted back to the requesting GMSC 80*a* via a return signal 255. In response to a receipt of the network address representing the second HLR 90*b*, the GMSC 80*a* transmits the received IAM 230 over the mobile network 260 with the received network address as the new Called Party Number. The originally received MSISDN is further included as the GAP within the transmitted IAM signal. In accordance with the conventional signal routing mechanism, the transmitted IAM signal 230 is routed to the GMSC 80*b* serving the second HLR 90*b*. In order to route the received IAM signal 230 to the serving MSC/VLR, the GMSC 80*b* transmits another SRI signal 270 requesting routing instruction to the second HLR 90*b* currently serving the ported mobile station 30. After receiving the SRI signal 270, the second HLR 90*b* transmits another MAP based signal, such as a Provide Roaming Number (PRN) signal 280, to the MSC/VLR 40 currently serving the ported mobile station 30. Using a return signal such as an PRN_Ack signal 290, the roaming number is then returned back to the second HLR 90*b*. The second HLR 90*b*, in turn, returns the received roaming number using another return signal such as an SRI_Ack signal 300 to the GMSC 80*b*. Utilizing the received roaming number, the GMSC 80*b* forwards the received IAM signal 230 to the indicated MSC/VLR 40. Once the serving MSC/VLR 40 receives the incoming IAM signal requesting a call connection with the ported mobile station 30, the serving MSC/VLR 40 determines the exact location of the ported mobile station 30, alerts the mobile station 30, and establishes a call connection via the radio channel 50.

By downloading data correlating a ported MSISDN with the network address representing a new HLR 90*a* to the donor HLR 90*a*, all call origination requests made by mobile stations within the donor PLMN 10*a* are rerouted directly to the second PLMN 10*b* without performing additional centralized database queries. Furthermore, all SSPs, STPs or GMSCs serving the donor PLMN 10*a* do not have to be capable of performing database queries to provide the number portability functionality within the mobile telecommunications environment. The donor HLR containing the downloaded correlation data properly forwards the calls not handled by the centralized database to the new PLMN currently serving the ported mobile station.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A system for assisting in routing an incoming call dialed to a ported mobile station having a directory number, said system comprising:

a donor home location register (HLR) within a donor public land mobile network (PLMN), wherein a subscription for said ported mobile station has been ported from and is no longer stored by said donor HLR;

a recipient HLR within a recipient PLMN, wherein said subscription for the ported mobile station has ported to and is currently stored by said recipient HLR;

a register within said donor HLR;

a centralized database storing data correlating said directory number for said ported mobile station with a network address representing said recipient HLR now storing the subscription for said ported mobile station;

a signal link connecting said donor HLR with said centralized database; and a first application module associated with said centralized database for transmitting a copy of said correlating data over the signal link from said centralized database to said donor HLR for storage in said register and for subsequent use in responding to and properly routing ported mobile station subscription related queries received at the donor HLR to the recipient HLR for handling.

2. The system of claim 1 wherein said directory number comprises a Mobile Station Integrated Services Digital Network (MSISDN) number.

3. The system of claim 1 wherein said centralized database comprises a Signal Control Point (SCP).

4. The system of claim 1 further comprising:

a Gateway Mobile Switching Center (GMSC) associated with said donor PLMN; and a second application module associated with said donor HLR for retrieving said correlated network address representing said recipient HLR from said register and for transmitting said retrieved network address to said GMSC in response to a receipt of a query requesting routing instruction sent from said GMSC.

5. A method for storing data correlating directory number for a ported mobile station with a network address representing a recipient home location register (HLR) currently storing a subscription for said ported mobile station, wherein said ported mobile station has been ported from a donor HLR not currently storing the subscription to said recipient HLR, said method comprising the steps of:

updating a centralized database with said data correlating said directory number of the ported mobile station with said network address representing said recipient HLR which is storing the subscription for said ported mobile station;

updating said donor HLR which is not storing the subscription for the ported mobile station with said data correlating said directory number of the ported mobile station with said network address representing said recipient HLR which is storing the subscription for said ported mobile station; and wherein the correlating data stored in the donor HLR is useful in responding to and properly routing ported mobile station subscription related queries received at the donor HLR to the recipient HLR for handling.

6. The method of claim 5 further comprising the steps of:

receiving a routing request by said donor HLR, said routing request including said ported mobile station directory number as a called party number;

retrieving said network address representing said recipient HLR correlated with said received ported mobile station directory number; and transmitting said retrieved network address representing said recipient HLR to a Gateway Mobile Switching Center (GMSC) associated with said donor HLR.

7. The method of claim 6 wherein said routing request is sent by said GMSC in response to a receipt of an incoming call with said directory number as a called party number, said method further comprising the steps of:

receiving said transmitted network address representing said recipient HLR by said GMSC; and rerouting said received incoming call to a Public Land Mobile Network (PLMN) associated with said recipient HLR by utilizing said received network address representing said recipient HLR as said called party number.

8. The method of claim 7 wherein said incoming call comprises a plurality of parameters and wherein said step of rerouting said incoming call further comprises the step of incorporating said directory number into one of said plurality of parameters.

9. The method of claim 5 wherein said directory number comprises a Mobile Station Integrated Services Digital Network (MSISDN) number associated with said ported mobile station.

10. The method of claim 5 wherein said centralized database comprises a Service Control Point (SCP).

11. A method for transmitting a signal requesting routing information towards a recipient home location register (HLR) currently storing a subscription for a ported mobile station having an assigned directory number, said mobile station having been ported from an area served by a donor HLR not currently storing the subscription for said ported mobile station to an area served by said recipient HLR without changing said directory number, said method comprising the steps of:

storing correlating data in said donor HLR correlating said directory number for the ported mobile station with said network address representing said recipient HLR;

receiving an incoming signal identified with said directory number by a first Gateway Mobile Switching Center (GMSC) associated with said donor HLR;

retrieving by the first GMSC of said network address representing said recipient HLR from said donor HLR in response to said incoming signal;

rerouting said incoming signal to a second Gateway Mobile Switching Center (GMSC) associated with said recipient HLR by utilizing said retrieved recipient HLR network address as a called party number; and transmitting a signal requesting subscription related information from said second GMSC to said recipient HLR.

12. The method of claim 11 wherein said directory number comprises a Mobile Station Integrated Services Digital Network (MSISDN) number.

13. The method of claim 11 wherein said incoming signal comprises an Initial Address Message (IAM).

14. The method of claim 11 wherein said incoming signal comprises a plurality of parameters and wherein said step of rerouting said incoming signal to said second GMSC further comprises the step of incorporating said directory number into one of said parameters.

15. The method of claim 11 further comprising the steps of:

storing said correlation data in a centralized database correlating said directory number with said network address representing said recipient HLR; and copying said correlation data to said donor HLR.

16. The method of claim 15 wherein said centralized database comprises a Service Control Point (SCP) connected to a Service Switching Point (SSP) for routing incoming calls.

17. The method of claim 15 wherein said step of retrieving said network address is performed only if said network address has not been retrieved from said centralized database before said incoming signal is received by said first GMSC.

18. A system for transmitting a signal requesting routing information towards a recipient home location register (HLR) currently storing a subscription for a ported mobile station having an assigned directory number, said mobile station having been ported from an area served by a donor HLR not currently storing the subscription for said ported mobile station to an area served by said recipient HLR without changing said directory number, said system comprising:

means for storing correlating data in said donor HLR correlating said directory number for the ported mobile station with said network address representing said recipient HLR;

means for receiving an incoming signal identified with said directory number by a first Gateway Mobile Switching Center (GMSC) associated with said donor HLR;

means for retrieving by said first GMSC of said network address representing said recipient HLR from said donor HLR in response to said incoming signal;

means for rerouting said incoming signal to a second Gateway Mobile Switching Center (GMSC) associated with said recipient HLR by utilizing said retrieved recipient HLR network address as a called party number; and means for transmitting a signal requesting subscription related information from said second GMSC to said recipient HLR.

19. The system of claim 18 wherein said directory number comprises a Mobile Station Integrated Services Digital Network (MSISDN) number.

20. The system of claim 18 wherein said incoming signal comprises a plurality of parameters and wherein said step of rerouting said incoming signal to said second GMSC further comprises the step of incorporating said directory number into one of said parameters.

21. The system of claim 18 further comprising:

a centralized database;

means for storing said correlation data in said centralized database correlating said directory number with said network address representing said recipient HLR; and means for copying said correlation data to said donor HLR.

22. The system of claim 21 wherein said centralized database comprises a Service Control Point (SCP) connected to a Service Switching Point (SSP) for routing incoming calls.

23. The system of claim 22 wherein said means for retrieving said network address is performed only if said network address has not been retrieved from said centralized database before said incoming signal is received by said first GMSC.

* * * * *